United States Patent [19]

Eischen

[11] Patent Number: 4,813,841

[45] Date of Patent: Mar. 21, 1989

[54] VEHICLE CARRIER

[76] Inventor: Edwin E. Eischen, 1705 - 12th St., Eldora, Iowa 50627

[21] Appl. No.: 191,335

[22] Filed: May 9, 1988

[51] Int. Cl.$^4$ ............................................. B60P 1/24
[52] U.S. Cl. ..................................... 414/477; 298/12; 414/485
[58] Field of Search ............... 414/469, 475, 477, 478, 414/479, 480, 485, 476, 482; 298/12, 14

[56] References Cited

U.S. PATENT DOCUMENTS

| | | | |
|---|---|---|---|
| 595,056 | 12/1897 | French | 298/12 |
| 2,468,502 | 4/1949 | Lisota | 414/477 |
| 3,455,474 | 7/1969 | Truncali | 414/485 |
| 3,630,571 | 12/1971 | Saldana | 298/14 |
| 3,690,490 | 9/1972 | Hall | 414/485 X |
| 4,470,746 | 9/1984 | Delachapelle | 414/477 X |
| 4,681,371 | 7/1987 | Leonard | 298/12 X |

Primary Examiner—Robert J. Spar
Assistant Examiner—R. Katz
Attorney, Agent, or Firm—Simmons, Perrine, Albright & Ellwood

[57] ABSTRACT

A vehicle carrier features a tiltable vehicle bed which, when a vehicle is driven rearwardly on the bed, both tilts upwardly at its front end and slides rearwardly to the ground so that the vehicle can be unloaded, the bed thereby making a less abrupt angle with the ground for facilitating unloading and loading of the vehicle. When a vehicle is driven onto the tilted bed, the latter both tilts downwardly at its front end and slides forwardly. All the foregoing is accomplished automatically by the vehicle itself without the need of any additional form of power to tilt or slide the bed.

10 Claims, 3 Drawing Sheets

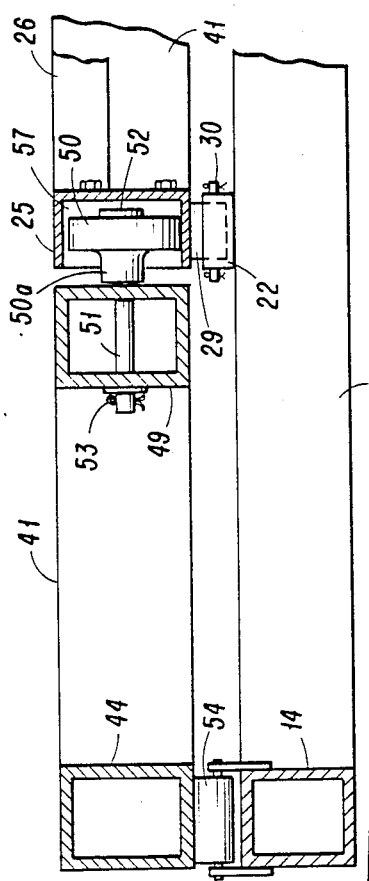
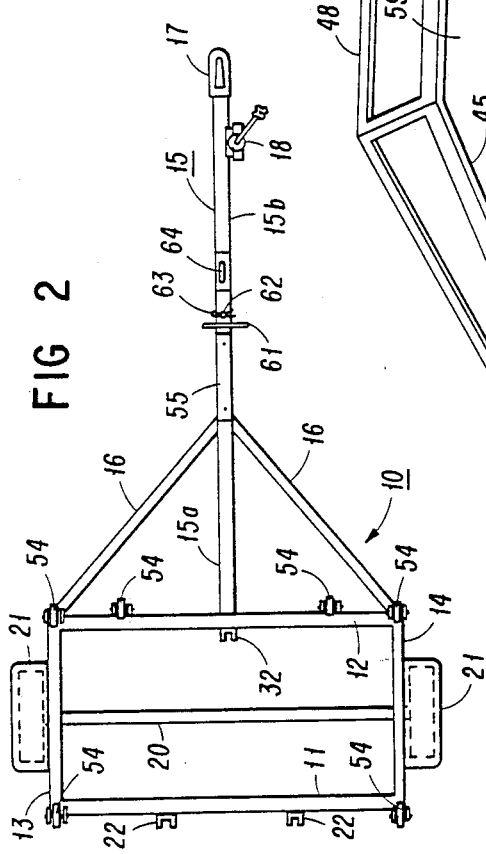
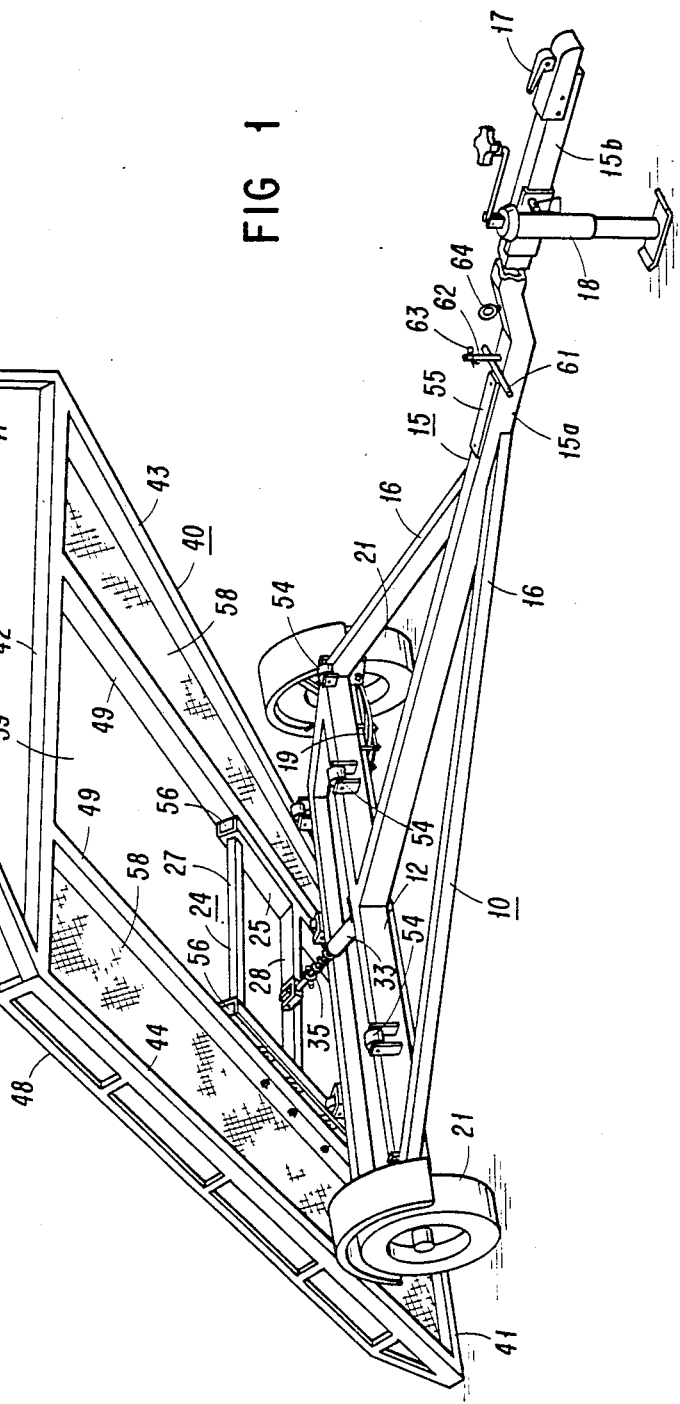
FIG 4
FIG 1
FIG 2

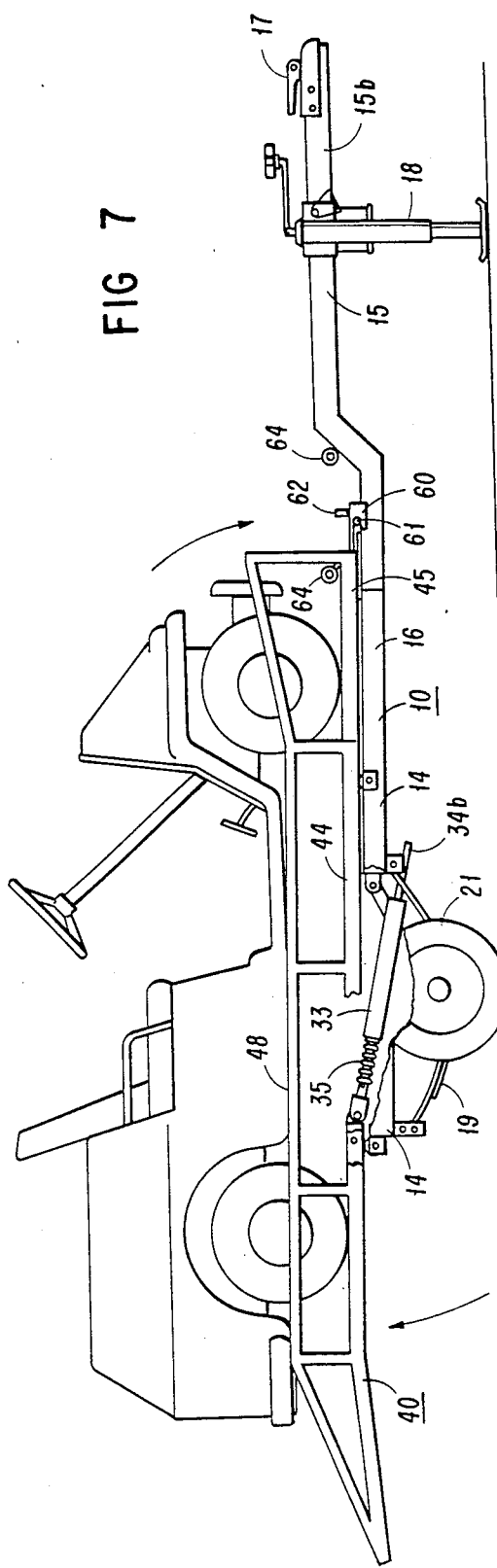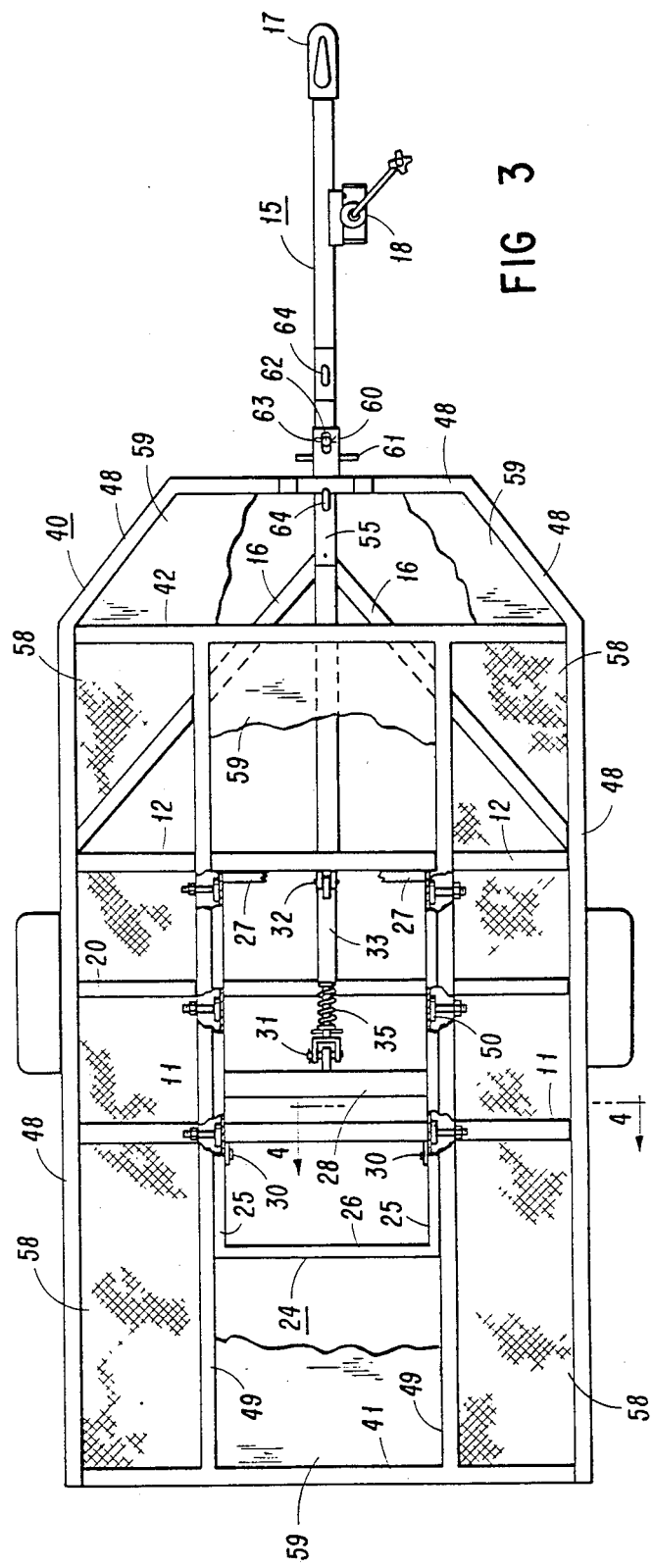

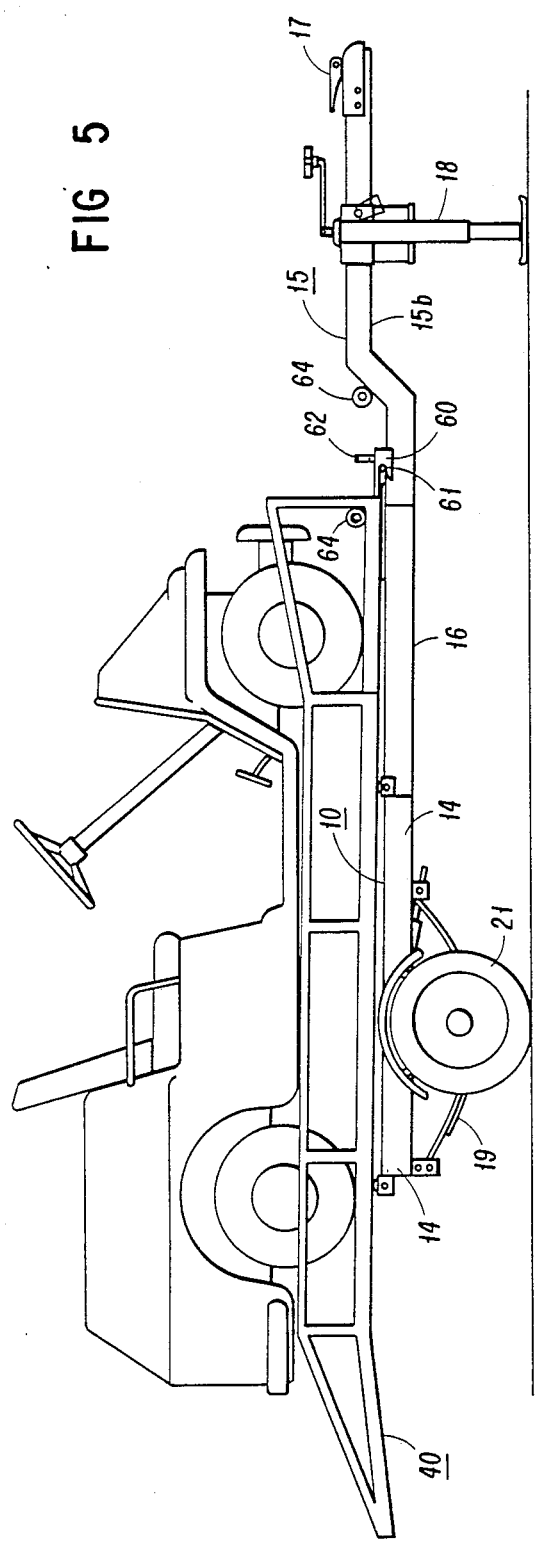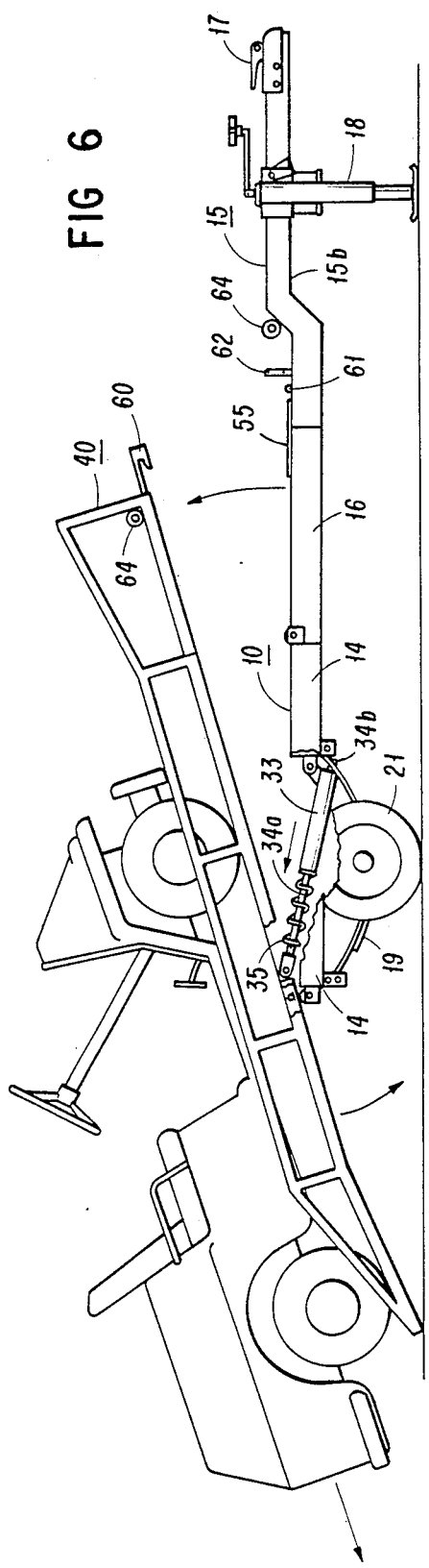

VEHICLE CARRIER

BACKGROUND OF THE INVENTION

The present invention concerns vehicle carriers and, more particularly, carriers which employ a tilting vehicle bed up or down which vehicles move when being respectively loaded onto or unloaded from the carriers, and is essentially embodied in a "Disclosure Document" entitled "Trailer", Document No. 176750, received in the U.S. Patent and Trademark Office Sept. 3, 1987.

The prior art abounds with carriers, either truck or trailer mounted, which employ tilting vehicle beds. So far as is presently known, however, the prior art of that nature most pertinent to the present invention resides in U.S. Pat. Nos. 4,514,131; 4,655,671; and 4,109,809. The first of these patents discloses a truck-mounted carrier having a sub-frame 14 to whose rear end is pivoted at 24 a lift frame 18. A load bed 28 is longitudinally slidable on the lift frame 18. As a ram 32 tilts the lift frame 18 about its pivot 24 another ram 30 moves the load bed 28 rearwardly to the ground relative to the lift frame 18. A like sequence restores the frame 18 and bed 28 to the horizontal. The rearward movement of the load bed 28 extends its effective length so as to provide a less abrupt angle between the ground and the bed 28. But power means, the rams 30 and 32 and controls 50 are needed in order for the foregoing to be accomplished. The second patent features a boat loading and unloading trailer having a tilting section 2, hinged at 5, and slidably receiving folding ramps 7 and 8 on which rides a wheeled cradle 4. When launching a boat the ramps 7 and 8 are slid rearwardly, presumably manually or by power means, and the cradle 4 with the boat moved back past the hinge 5, whereupon the ramp 7 tilts downwardly and the ramp 8 forms a platform in the water supporting the cradle 4. Here again substantially the same effect results as in the U.S. Pat. No. 4,514,131 but either power or manual means are necessary to slide the ramps 7 and 8 back and forth. The third patent describes a trailer having ramps 26 and 27 hinged at 35 which are tilted between horizontal and inclined positions by fore-and-aft movement of the vehicles 12 owing to the change in the center of gravity about the hinge 35. The ramps 26 and 27, however, are relatively short, making an abrupt angle with the ground, and requiring a separate "bed" (the turntable 33) on which to store the vehicles. The result is a trailer of extensive overall length.

The primary object of the present invention is thus to provide a vehicle carrier in which the bed not only serves as a bed on which to carry a vehicle but also as a ramp by which the vehicle can be automatically loaded and unloaded, all, however, without the need of any manual effort or of any power means such as hydraulic rams, winches or the like, in order to do so.

SUMMARY OF THE INVENTION

The chief object of the invention is achieved by a carrier which in trailer form includes a main-frame having a pair of wheels and a forward tongue for towing. To the rear of the main-frame is transversely pivoted an overlying slide-frame on which a vehicle bed is longitudinally slidable. The pivot axis of the slide-frame, however, is elevated such that when in loaded position the rear ends of the slide-frame and vehicle bed are at an elevation above that of their forward ends, and the combined center of gravity of the slide-frame and vehicle bed lies forward of the pivot axis of the slide-frame.

As a vehicle on the bed is driven rearwardly past the foregoing pivot axis, the change in center of gravity causes the bed and slide-frame automatically to tilt upwards and at the same time allows the bed to slide rearwardly relative to the slide-frame until its rear end reaches the ground. The bed then becomes an extended ramp making a relatively shallow angle with the ground from which the vehicle can be driven off. As the vehicle is reloaded up the bed past the foregoing pivot axis, the slide-frame and bed tilt downwards. As they reach the horizontal the bed automatically slides forwardly relative to the slide-frame owing to the elevated rear pivot axis of the slide-frame. A spring-loaded hydraulic cylinder interposed between the main and slide-frames acts as a dashpot to control the rate of tilt of the slide-frame and vehicle bed between their two positions.

Hence loading and unloading of vehicles can be accomplished without manual effort or the need for hydraulic or other kind of actuation requiring an accompanying or external source of power. Other features and advantages of the invention will be apparent from the drawings and the more detailed description which follows.

BRIEF DESCRIPTION OF THE DRAWINGS

FIG. 1 depicts the invention in trailer form with the vehicle bed tilted for loading of a vehicle.

FIG. 2 is a plan view of the main-frame of the trailer.

FIG. 3 is a plan view of the trailer of FIG. 1 but showing the vehicle bed in its loaded or carry position.

FIG. 4 is a sectional view taken along the lines 4—4 of FIG. 3.

FIGS. 5, 6 and 7 are elevational views of the trailer illustrating the unloading and loading of a vehicle.

DETAILED DESCRIPTION OF THE PREFERRED EMBODIMENT

Turning first to FIGS. 1-4, the trailer, which as shown is adapted for golf carts, consists of a welded-up mainframe 10 of rectangular steel tubing including cross-rails 11, 12 and side-rails 13, 14. From the midpoint of the front cross-rail 12 extends a tongue 15 consisting of off-set lower and upper members 15a and 15b, the former being located by braces 16. The forward end of the upper member 15b is fitted with a ball hitch 17 to the rear of which is a screw jack 18 for supporting the forward end of the trailer above the ground. The side-rails 13, 14 carry a pair of leaf springs 19 supporting an axle 20 to which are journaled rubber-tired wheels 21. The rear cross-rail 11 carries a pair of elevated cleves 22 to which is pivoted the underside of a relatively short slide-frame 24 which overlies the main-frame 10. The slide-frame 24 is also a weldment and consists of a pair of side-rails in the form of outwardly facing channels 25 jointed at their rear and front ends by cross-rails 26, 27 and intermediate their ends by a stout cross member 28, all of steel tubing. A pair of knuckles 29 disposed forward of the rear cross-rail 26 depend from the channels 25 and are pivoted at 30 about a transverse axis to the cleves 22. A hinge plate 31 is welded midway along the front face of the cross member 28 and a clevis 32 midway along the rear face of the main-frame cross-rail 12 between which is pivotally attached a hydraulic damper or dashpot in the form of a cylinder 33 with a flow restriction port through its piston and opposite piston rods 34a and 34b. A compressible coil spring 35 operatively surrounds the exposed portion of the piston rod 34a.

The slide-frame 24 is straddled by a vehicle bed 40, likewise a weldment of steel tubing, consisting of cross-rails 41 and 42, side-rails 43 and 44, and a trapezoidal nose formed of members 45, 46 and 47 forward of the cross-rail 42. The sides and the forward end of the bed 40 are surmounted by guardrailing 48. A pair of inner rails 49 extend between the bed cross-rails 41 and 42 just outboard of the slide-frame channels 25 to which the bed frame 40 is slidably mounted. That mounting takes the form of three sets of steel, sealed bearing rollers 50 operating within the channels 25, as best shown in FIG. 4. The rollers 50 are journaled on axles 51, headed at 52, which extend through the bed rails 49 and are secured by washers and cotter pins 53, the rollers 50 being further axially located by hubs 50a. Accordingly, the bed 40 can slide fore-and-aft relative to the slide-frame 24 between a forward position shown in FIG. 5 and a rearward position shown in FIG. 7, the bed rails 43, 44 and 49 riding on rollers 54 secured to the main-frame cross-rails 11 and 12 and the bed forward end member 46 on a plastic plate 55 secured atop the tongue 15 (see FIGS. 1 and 2). In order to prevent the bed 40 from becoming disengaged from the slide-frame 24, a pair of stops 56 are welded into the forward ends of the channels 25 and a pair of stops 57 are bolted into the rearward ends of the channels 25 after fitting of the bed 40 to the slide-frame 24 (see FIGS. 1 and 4). The stops 56 and 57 are engaged by the forward and rearward-most slide-frame rollers 50 in order to halt, respectively, forward and rearward movement of the bed 40. The two areas of the bed 40 between the cross-rails 41, 42 and the outer and inner bed rails 43, 44 and 49 are decked over with expanded steel grating 58 to support and provide traction for the wheels or the like of a vehicle. The areas between the inner bed rails 49 and the cross-rails 41 and 42, on the one hand, and the cross-rail 42 and the forward end members 45, 46 and 47, on the other hand, are covered with plywood or other suitable flooring 59 as indicated in FIG. 3.

FIG. 5 depicts the trailer in its loaded or carry position, in which position the combined centers of gravity of the slide-frame 24 and bed 40 is disposed forward of the pivot axis 30. A vehicle, in this case a golf cart, is shown in position on the vehicle bed 40 ready for transport, the bed 40 being secured in that position by a latch 60 pivoted to the bed forward end member 46. The latch 60 straddles the tongue 15, engages a latch cross-bar 61 atop the latter, and at the same time receives therethrough a vertical stud 62 through which in turn passes a safety clip 63 to lock the latch 60 in position. Eyes 64 are also fitted to the tongue 15 and the bed forward member 46 to tie-down a vehicle on the bed 40. In order to unload the vehicle the safety clip 63 is withdrawn and the latch 60 lifted in order to release the bed 40. The vehicle is then driven rearwardly until the combined centers of gravity of the vehicle, the slide-frame 24 and the bed 40 are rearward of the pivot 30, whereupon the slide-frame 24 and bed 40 tilt upwardly, the rate of tilt being governed by the restriction port of the hydraulic cylinder 33 and by the spring 35. As it tilts the bed 40 also slides rearwardly relative to the slide-frame 24 until the rear end of the bed 40 engages the ground. The bed 40, which as indicated in FIG. 6 is then in its load and unload position, thus makes a shallower, less abrupt angle with the ground than would be the case were the bed not to move rearwardly relative to the slide-frame 24. After the vehicle is driven off, the spring 35 retains the bed 40 elevated, yet allows it to be moved manually between its two positions.

As the bed 40 is moved from its tilted or load and unload position to its loaded or carry position, and as it nears the latter position, the bed 40 slides forwardly relative to the slide-frame 24 until halted by the stops 56. This occurs owing to the elevation of the pivot axis 30 above the main-frame 10. In a prototype of the invention the pivot axis 30 is disposed about 8 to 9 inches forward of the rearward end of the slide-frame 24 and elevated such that the rear end of the bed 40 is about 1½ to 2 inches higher than its forward end when the bed 40 is in its carry position, as shown in FIG. 5. Hence, when a vehicle is driven on to the bed 40 in its tilted or load position, and as the vehicle passes the pivot axis 30, the bed 40 and vehicle descend toward the loaded or carry position, the bed 40 then sliding forwardly relative to the slide-frame 24, as shown in FIG. 7, until finally the carry position is again reached as shown in FIG. 5. As the bed 40 slides forward the latch 60 rides up over the latch-bar 61 and then falls into latching position over the stud 62, after which the safety clip 63 is inserted to secure the bed 40.

The trailer of the invention is also useful for other vehicles, such as snowmobiles and garden tractors, and the principle of the invention can be applied to a truck bed as well as to a trailer, as shown. In each of those cases the hydraulic damping cylinder 33 would be replaced with one having a different damping rate in order to accommodate the weight of the vehicle concerned. Or, of course, a cylinder having an adjustable restriction port could be used. Scaled up versions of the invention could be employed for larger vehicles such as earth working machines and the like. Hence, though the invention has been described in terms of a particular embodiment, being the best mode known of carrying out the invention, it is not limited to that embodiment alone. Instead, the following claims are to be read as encompassing all adaptations and modifications of the invention falling within its spirit and scope.

I claim:

1. In a carrier for vehicles or the like, the carrier including a main-frame having forward and rearward ends, a slide-frame having forward and rearward ends and overlying the main-frame, a vehicle bed having forward and rearward ends and straddling the slide-frame, the slide-frame being pivotally connected to the main-frame about a transverse axis adjacent the rearward end of the main-frame, and means connecting the vehicle bed to the slide-frame so that the vehicle bed and slide-frame are tiltable as a unit about said pivot axis and so that the vehicle bed is also reciprocally movable relative to the slide-frame in sliding fore-and-aft directions, the vehicle bed automatically slidably moving relative to the slide-frame from a forward vehicle carry position to a tilted rearward vehicle load-and-unload position consequent to upward tilting movement of the forward ends of the vehicle bed and the slide-frame about said pivot axis, said sliding movement of the vehicle bed and the consequent rearward extent of same when in its vehicle load-and-unload position being effective so that the rearward end of the vehicle bed thereupon engages the ground, the improvement wherein, when the vehicle bed is in its carry position, said pivot axis is disposed so that the rearward ends of the slide-frame and the vehicle bed are at an elevation above that of the forward ends thereof and the combined center of gravity of the slide-frame and the vehicle bed is disposed forward of said pivot axis, and wherein said pivot axis is also disposed intermediate the forward and rearward ends of the vehicle bed so that, when the vehicle bed is in its carry position, rearward movement of a vehicle on the vehicle bed past said pivot axis will automatically cause movement of the vehicle bed to its load-and-unload position and, when the vehicle bed is in its load-and-unload position, forward movement of a vehicle on the vehicle bed past said pivot axis will automatically cause movement of the vehicle bed to its carry position.

2. The carrier of claim 1 including first means interposed between the main and slide-frames effective to control the rate of tilt of the slide-frame and the vehicle bed relative to the main-frame.

3. The carrier of claim 2 wherein the first means includes a dashpot having a hydraulic cylinder.

4. The carrier of claim 3 further including second means interposed between the main and slide-frames effective to maintain the slide-frame and the vehicle bed in their load-and-unload position in the absence of a vehicle on the vehicle bed but allowing manual return of the slide-frame and the vehicle bed to their carry position.

5. The carrier of claim 4 wherein the second means includes a compressible coil spring operative between the hydraulic cylinder and the slide-frame.

6. The carrier of claim 1 wherein the carrier comprises a trailer, the main-frame having means at its forward end for towing the trailer and a pair of laterally disposed wheels supporting the trailer on the ground for travel thereover.

7. The carrier of claim 6 including first means interposed between the main and slide-frames effective to control the rate of tilt of the slide-frame and the vehicle bed relative to the main-frame.

8. The carrier of claim 7 wherein the first means includes a dashpot having a hydraulic cylinder.

9. The carrier of claim 8 further including second means interposed between the main and slide-frames effective to maintain the slide-frame and the vehicle bed in their load-and-unload position in the absence of a vehicle on the vehicle bed but allowing manual return of the slide-frame and the vehicle bed to their carry position.

10. The carrier of claim 9 wherein the second means includes a compressible coil spring operative between the hydraulic cylinder and the slide-frame.

* * * * *